UNITED STATES PATENT OFFICE.

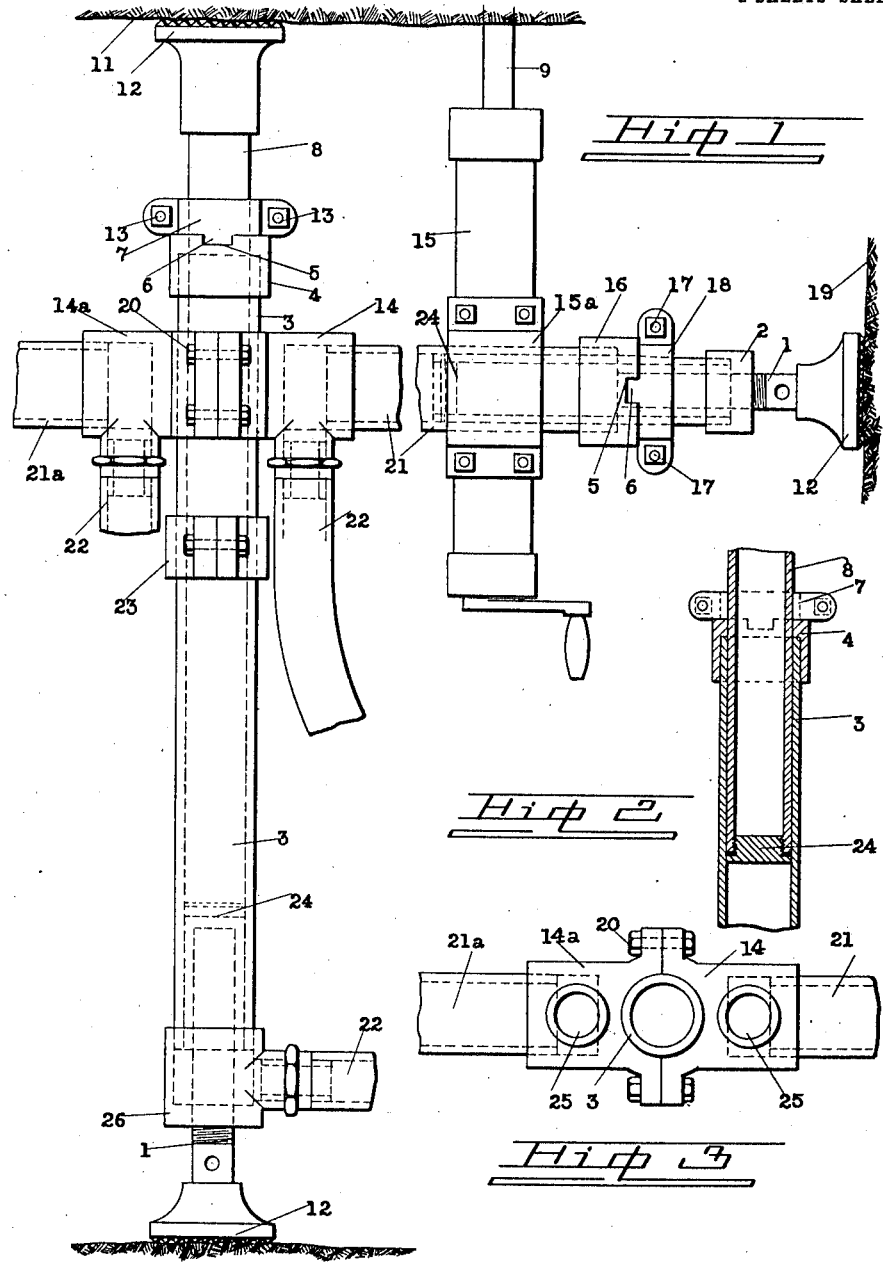

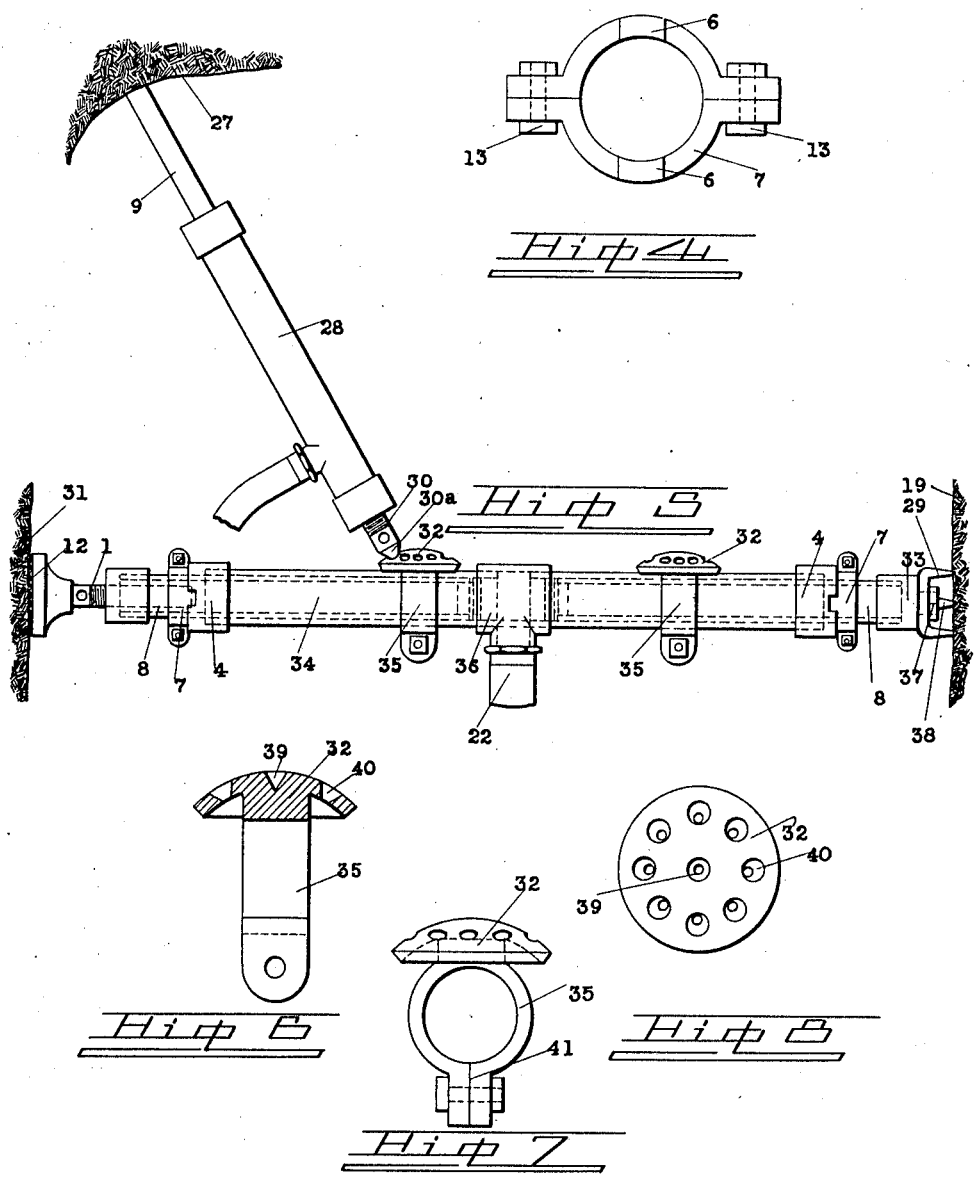

GEORGE C. ARNDT, OF PORTLAND, AND GILBERT N. JACK, OF WILLAMINA, OREGON.

MINING-MACHINE BAR.

1,026,295.  Specification of Letters Patent.  Patented May 14, 1912.

Application filed March 23, 1911. Serial No. 616,408.

*To all whom it may concern:*

Be it known that we, GEORGE C. ARNDT and GILBERT N. JACK, citizens of the United States, residing at Portland, county of Multnomah, Oregon, and Willamina, in the county of Yamhill and State of Oregon, respectively, have invented certain new and useful Improvements in Mining-Machine Bars, of which the following is a specification.

This invention relates to improvements in mining machine bars, and has for its object to provide a bar having telescoping members, and which can be quickly and conveniently set up for operation in all ordinary conditions of mining, without the need of bridging, which is necessary in the usual bar or column. We accomplish this object by the mechanism illustrated in the accompanying drawings, in which—

Figure 1 is an elevation of the column in operative position. Fig. 2 is a detail sectional elevation of a portion of the column. Fig. 3 is a top view of a portion of a machine bar clamp. Fig. 4 is a bottom view of a clutch. Fig. 5 shows a bar dispensing with the central column, used for hammer drills or stopers. Fig. 6 is a sectional elevation of a supporting plate or seat. Fig. 7 is a side elevation of same. Fig. 8 is a top view thereof.

Like characters of reference designate like parts in each of the several views.

In the drawings 3 designates a column as used in the ordinary mining operations, mounted upon the jack screw 1, resting upon the block 12. At the upper end of the column or bar, is secured a collar 4, either integrally or otherwise, the upper edge of which projects a short distance above the column, and is provided with recesses or seats 5. The tube 8 is made to telescope within the tube 3 and is provided at its inner end with the piston 24. At its upper end is formed the block or column top 12, adapted to bear against the rock or top 11, of the excavation. The clamp 7 is adapted to move along the tube 8, and by means of the bolt 13, may be secured at any desired point. The projections 6 engage in the seats or recesses 5, thereby forming a clutch which prevents the telescoping member 8 from turning in the tube 3.

Upon the column or bar 3, is secured the clamp, consisting of the members 14 and 14ª, which are held in place by the bolts 20. In the member 14 is attached the tube 21, having a clutch collar 16, similar to the collar 4, formed at its end. Within the tube 21 telescopes the tube 2, having at its inner end the piston 24 and at its outer end a jack screw 1, bearing against the block or column top 12, resting against the wall 19. Upon the tube 2 is secured the clamp 18, by means of the bolt 17, which is provided with lugs 6 to engage in the recesses 5, to prevent the tube 2 from turning. In the member 14 of the clamp is formed the intake opening 25, in which is secured the pipe 22. Similarly, in the member 14ª of the clamp is secured the tube 21ª in which also is secured a telescoping member, similar to the tube 2 and provided with a clutch to hold it from turning and with a block or column top to bear against the opposite wall. These tubes 21 constitute a horizontal bar, which may be secured at any desired height, on the column, against the safety clamp 23, with the extremities resting against the opposing walls of the tunnel or excavation. Upon this bar is mounted the chuck or machine drill 15, by means of any usual clamp 15ª; and it may be clamped at any point along the bar so as to bring the drill 9 to the proper position for operating in the rock overhead. It is obvious that machines may be operated simultaneously upon both arms of the bar.

In the operation of this device, which is adapted to the employment of compressed air, steam, or other suitable power, the column is placed in the desired position upon the floor of the workings, and the pipe 22, which is connected with the compressed air supply, is attached to the intake 26. The air, which is admitted in the usual manner, acting against the piston 24, quickly forces the tube 8 upward till the upper end contacts with the roof 11, where it is firmly secured as above described, by the clamp 7. The pipe 22 is then detached and in turn, attached to the intakes 25 of the members 14 and 14ª respectively, of the bar clamp. In the same manner the respective telescoping members of the bar, will be extended against the corresponding walls and similarly secured there.

In Fig. 5 is shown a bar which is secured in working position between the opposing walls 19 and 31, without the intervening supporting column. In this case we have formed what corresponds to the top telescoping member, with a pointed end 38, over which is placed the block or column-top 33, having the prongs 29 and held in place by the nut 37. This bar is set up in the same manner as that above described, by attaching the compressed air pipe 22 to the intake port 36, when the telescoping members are at once forced outward against their respective walls. The jack screw 1 affords a means of adjusting the bar, within small range, when desired. It is obvious that this bar may be placed horizontally, vertically, or at any angle that the irregularity of the surfaces may require. It is especially adapted to the use of the hammer drill or stoper, which is of light weight and causes but little vibration when in operation.

Upon either arm of the bar is movably secured a drill-support 32, by means of the clamp 35, which may be made of a single member, as illustrated, in Figs. 6 and 7. The plate or support 32 is provided with a central vertical recess or seat 39, and at its periphery, with a series of angularly disposed seats 40. These seats are adapted to receive the correspondingly formed end 30$^a$ of the feed bar 30, carrying the stoper 28. Fig. 5 shows the stoper carrying a drill 9 engaged in the rock 27, at an angle of approximately forty degrees from the vertical.

It will be apparent that the drill may be set at any angle desired, by use of the means here employed. It is also apparent that other purposes may be served and other uses made of our invention; and we do not limit ourselves to the precise construction or arrangement of mechanism herein shown, as they may be varied and modified according to the skill and judgment of a mechanic without altering any essential element, departing from any vital principle or sacrificing the advantages of our invention.

What we claim and desire to secure by Letters Patent, is—

1. In a device of the character described, a column,—an end-piece telescoping therein,—a collar provided at its edge with recesses, secured at the upper end of said column,—a clamp mounted on the end-piece and adapted to be secured at any point thereon,—and projections on the clamp adapted to engage the recesses of said collar.

2. In a machine bar, a tube, end pieces provided with inner terminal pistons telescoping therein, a collar secured to each end of the tube and provided at its edge with recesses, and a clamp detachably secured upon each end piece having projections adapted to engage in said recesses.

3. In a machine bar, a tube, end-pieces provided at their outer ends with means for engaging external walls and at their inner ends with a piston telescoping therein, a collar secured to each end of the tube provided at its edge with recesses, and a clamp detachably secured upon each end-piece having projections adapted to engage in said recesses.

4. The combination of a machine bar having end members telescoping therein, with a drill seat comprising a segment of a sphere, which is provided in its upper face with a central vertical recess and with a series of angularly disposed recesses about its periphery,—and a clamp, for detachably securing the seat at varying positions along the bar.

5. A column for supporting drills comprising in combination, a tubular body portion, end-pieces telescoping therein, pistons secured on said end-pieces, a clutch comprising a collar having recesses at its edge secured at each end of the body portion, a clamp detachably secured upon each end-piece having projections adapted to engage in said recesses, and means for admitting an elastic fluid to the body portion for extending the end-pieces.

6. The combination of a machine bar with a drill seat, comprising a segment of a sphere, which is provided in its upper face with a central vertical recess and with a series of angularly disposed recesses about its periphery, and means for securing the seat at varying positions along the bar.

In testimony whereof we affix our signatures in presence of two witnesses.

GEORGE C. ARNDT.
GILBERT N. JACK.

Witnesses:
W. P. HIBBARD,
P. SWEEDMAN.

Copies of this patent may be obtained for five cents each, by addressing the "Commissioner of Patents, Washington, D. C."